US012618645B1

(12) United States Patent
Wilson et al.

(10) Patent No.: US 12,618,645 B1
(45) Date of Patent: May 5, 2026

(54) SCOPE PROTECTOR FOR WEAPON SCOPE

(71) Applicant: RO TECHNOLOGIES, LLC, Las Vegas, NV (US)

(72) Inventors: Stephen S. Wilson, Las Vegas, NV (US); Bart E. Wilson, Las Vegas, NV (US); Roger Cone, Las Vegas, NV (US)

(73) Assignee: RO TECHNOLOGIES, LLC, Las Vegas, NV (US)

( * ) Notice: Subject to any disclaimer, the term of this patent is extended or adjusted under 35 U.S.C. 154(b) by 0 days.

(21) Appl. No.: 19/042,358

(22) Filed: Jan. 31, 2025

(51) Int. Cl.
*F41G 1/38* (2006.01)
*G02B 23/16* (2006.01)

(52) U.S. Cl.
CPC ............. *F41G 1/383* (2013.01); *G02B 23/16* (2013.01)

(58) Field of Classification Search
CPC ....................................................... F41G 1/383
USPC .......................................................... 42/143
See application file for complete search history.

(56) References Cited

U.S. PATENT DOCUMENTS

| 5,561,563 | A | * | 10/1996 | Chesnut | ................... | F41G 1/383 |
| | | | | | | 359/822 |
| 6,811,268 | B2 | * | 11/2004 | Watson | ................... | F41G 1/383 |
| | | | | | | 42/129 |
| 6,904,688 | B1 | | 6/2005 | Henry | | |
| 7,585,080 | B2 | * | 9/2009 | Ballard | ................... | F41G 1/383 |
| | | | | | | 42/129 |

| 7,959,127 | B2 | | 6/2011 | Newton et al. | | |
| 9,069,111 | B1 | | 6/2015 | Jones | | |
| 9,157,586 | B1 | * | 10/2015 | Babcock, IV | ........ | F21V 17/107 |
| 11,150,053 | B1 | * | 10/2021 | Dunning | ................ | F41G 1/383 |
| 2002/0167731 | A1 | | 11/2002 | Watson | | |
| 2008/0186584 | A1 | * | 8/2008 | Ballard | ................... | F41G 1/383 |
| | | | | | | 359/511 |
| 2015/0268000 | A1 | | 9/2015 | Carroll | | |
| 2018/0100722 | A1 | | 4/2018 | McDaniels | | |
| 2019/0219834 | A1 | | 7/2019 | Ace | | |

(Continued)

FOREIGN PATENT DOCUMENTS

| CA | 2383439 | A1 | * | 3/2001 | ............. | G02B 1/111 |
| CA | 3090173 | C | * | 9/2023 | ............. | G02C 7/104 |
| GB | 2427484 | A | * | 12/2006 | ............... | G02B 3/14 |

OTHER PUBLICATIONS

International Search Report and Written Opinion for PCT/2026/013055; mailed Mar. 30, 2026.

*Primary Examiner* — John Cooper
(74) *Attorney, Agent, or Firm* — Stetina Garred Brucker & Newboles

(57) ABSTRACT

A scope protector for a weapon scope includes a scope adapter defining a cylindrical bore, the scope adapter having a first end that is configured to connect to an end of the weapon scope to align the cylindrical bore of the scope adapter with a lens of the weapon scope. The scope protector may further include a lens cover defining a cylindrical bore, the lens cover being configured to connect to a second end of the scope adapter opposite the first end (and/or to an intervening diffuser adapter housing a diffuser such as a honeycomb diffuser) to align the cylindrical bore of the lens cover with the lens of the weapon scope. The scope protector may further include one or more transparent polymer films housed within the lens cover so as to cover the cylindrical bore thereof.

17 Claims, 5 Drawing Sheets

(56)        References Cited

U.S. PATENT DOCUMENTS

2023/0168065 A1     6/2023  Dunning
2023/0273459 A1*    8/2023  Cooper ............. B29D 11/0073
                                             351/159.42

* cited by examiner

SCOPE PROTECTOR FOR WEAPON SCOPE

CROSS-REFERENCE TO RELATED APPLICATIONS

Not Applicable

STATEMENT RE: FEDERALLY SPONSORED RESEARCH/DEVELOPMENT

Not Applicable

BACKGROUND

A scope (also referred to as a telescopic sight), such as may be mounted on a rifle or other firearm, may typically include an objective lens or group of lenses on the front (i.e., farthest from the shooter) as well as an ocular lens or group of lenses on the rear (i.e., nearest the shooter). Because of their exposed placement and the importance of these lenses to the functioning of the optical system, it is common to provide a scope cap or cover on one or both such lenses in order to prevent damage to the lens as well as to keep moisture, dust, and dirt out of the scope. Unfortunately, protecting the lenses in this way requires a degree of care and attention on the part of the shooter, who must either remove and replace the cap or else flip the cap open and closed when using the weapon. In practice, especially in actual combat, the shooter is likely to instead discard (or lose) the cap rather than devote the necessary attention to its proper use. As a result, new scope caps must frequently be provided and, moreover, the lenses are often left unprotected and likely to become damaged.

BRIEF SUMMARY

The present disclosure contemplates various devices, systems, and methods for overcoming the above drawbacks accompanying the related art. One aspect of the embodiments of the present disclosure is a scope protector for a weapon scope. The scope protector may comprise a scope adapter defining a cylindrical bore, the scope adapter having a first end that is configured to connect to an end of the weapon scope to align the cylindrical bore of the scope adapter with a lens of the weapon scope. The scope protector may further comprise a lens cover defining a cylindrical bore, the lens cover being configured to connect to a second end of the scope adapter opposite the first end to align the cylindrical bore of the lens cover with the lens of the weapon scope. The scope protector may further comprise a transparent polymer film housed within the lens cover so as to cover the cylindrical bore thereof.

Another aspect of the embodiments of the present disclosure is a scope protector for a weapon scope. The scope protector may comprise a scope adapter defining a cylindrical bore, the scope adapter having a first end that is configured to connect to an end of the weapon scope to align the cylindrical bore of the scope adapter with a lens of the weapon scope. The scope protector may further comprise a diffuser adapter defining a cylindrical bore, the diffuser adapter having a first end that is configured to connect to the second end of the scope adapter to align the cylindrical bore of the diffuser adapter with the lens of the weapon scope. A diffuser (e.g., a honeycomb diffuser) may be housed within the diffuser adapter and arranged to diffuse light entering the cylindrical bore thereof. The scope protector may further comprise a lens cover defining a cylindrical bore, the lens cover being configured to connect to a second end of the diffuser adapter opposite the first end to align the cylindrical bore of the lens cover with the lens of the weapon scope. The scope protector may further comprise a transparent polymer film housed within the lens cover so as to cover the cylindrical bore thereof.

Another aspect of the embodiments of the present disclosure is a scope protector for a weapon scope. The scope protector may comprise a scope adapter defining a cylindrical bore, the scope adapter having a first end that is configured to connect to an end of the weapon scope to align the cylindrical bore of the scope adapter with a lens of the weapon scope. The scope protector may further comprise a lens cover defining a cylindrical bore, the lens cover being configured to connect to a second end of the scope adapter opposite the first end to align the cylindrical bore of the lens cover with the lens of the weapon scope. The scope protector may further comprise a stack of two or more transparent polymer films housed within the lens cover so as to cover the cylindrical bore thereof.

The transparent polymer film may have an antireflective coating such as a moth eye coating. The transparent polymer film may have a hard coat. The transparent polymer film may have a coating containing one or more dyes each having a full width at half maximum (FWHM) absorption bandwidth of 40 nm or less. In a case where there is more than one transparent polymer film, any one or more of the transparent polymer films may have the antireflective coating, the hard coat, and/or the coating containing the one or more dyes. The transparent polymer film (or any one or more of the transparent polymer films in a case where there is more than one) may comprise biaxially oriented polyethylene terephthalate (BoPET). In a case where there is more than one transparent polymer film, there may be an adhesive between an adjacent pair of the transparent polymer films. The adhesive may contain one or more dyes, each of the one or more dyes having a full width at half maximum (FWHM) absorption bandwidth of 40 nm or less.

In a case where the lens cover is configured to connect to the second end of the scope adapter, the scope protector may still comprise a diffuser between the first end of the scope adapter and the transparent polymer film(s). For example, the scope protector may comprise a diffuser adapter defining a cylindrical bore, and the diffuser may be housed within the diffuser adapter and arranged to diffuse light entering the cylindrical bore thereof. The diffuser adapter may have a first end that is configured to connect to the second end of the scope adapter in place of the lens cover to align the cylindrical bore of the diffuser adapter with the lens of the weapon scope. In addition to being configured to connected to the second end of the scope adapter, the lens cover may be configured to connect to a second end of the diffuser adapter opposite the first end to align the cylindrical bore of the lens cover with the lens of the weapon scope.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a scope protector that incorporates one or more polymer films and may be used for weapon scopes or other telescopic sights, along with methods of manufacture and use thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
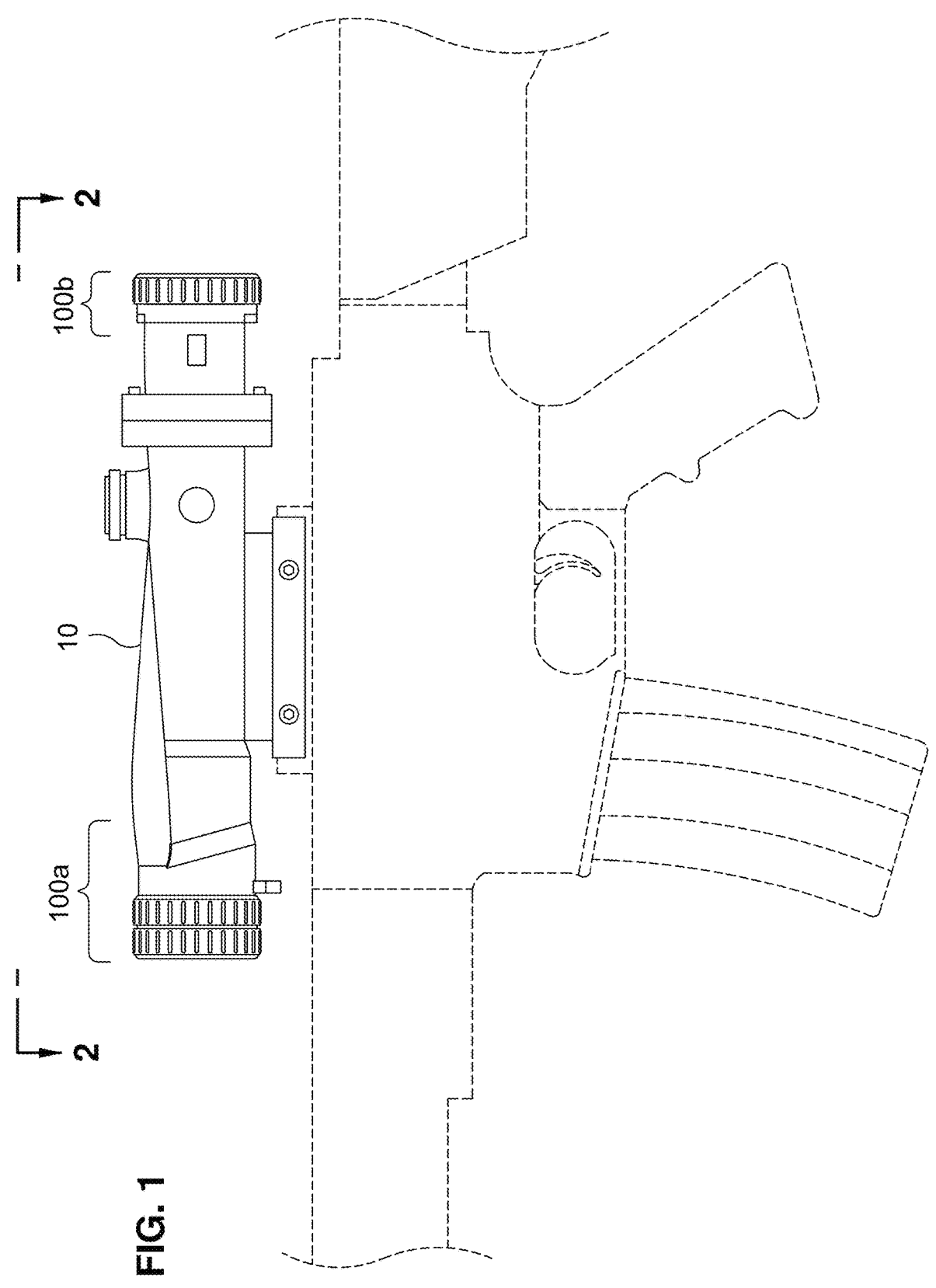
FIG. 1 is a side view of a pair of scope protectors on a weapon scope attached to a firearm.
Figure 2:
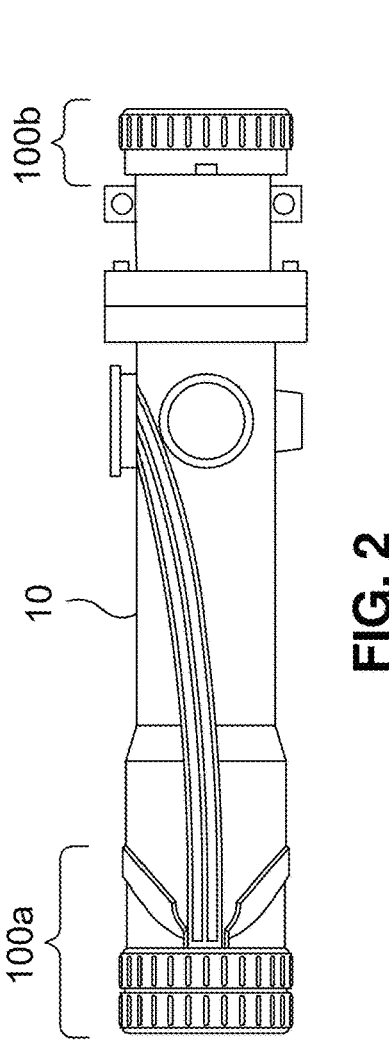
FIG. 2 is a top view of the pair of scope protectors on the weapon scope.

FIG. 1 is a side view of a pair of scope protectors 100*a*, 100*b* on a weapon scope 10 attached to a firearm such as a rifle (shown in phantom), with FIG. 2 being a top view thereof. The scope protectors 100*a*, 100*b* may be configured to connect to respective front and rear ends of the weapon scope 10 as shown and may each house a stack of one or more transparent polymer films, preferably having low reflectivity. Advantageously, the transparent polymer film may serve as a protective cap while simultaneously allowing the shooter or other user to see through the optical system of the weapon scope 10. Thus, the user need not remove the scope protector 100*a*, 100*b* or open any kind of cover to use the weapon scope 10. The user may simply peer through the aligned scope protector 100*b*, weapon scope 10, and scope protector 100*a* to locate a target or otherwise aim the weapon or other equipment. Afterward, the user need not replace or close any kind of cover, allowing the user to focus only on the firing of the weapon, moving to another position, or other critical task without distraction.

Figure 3:
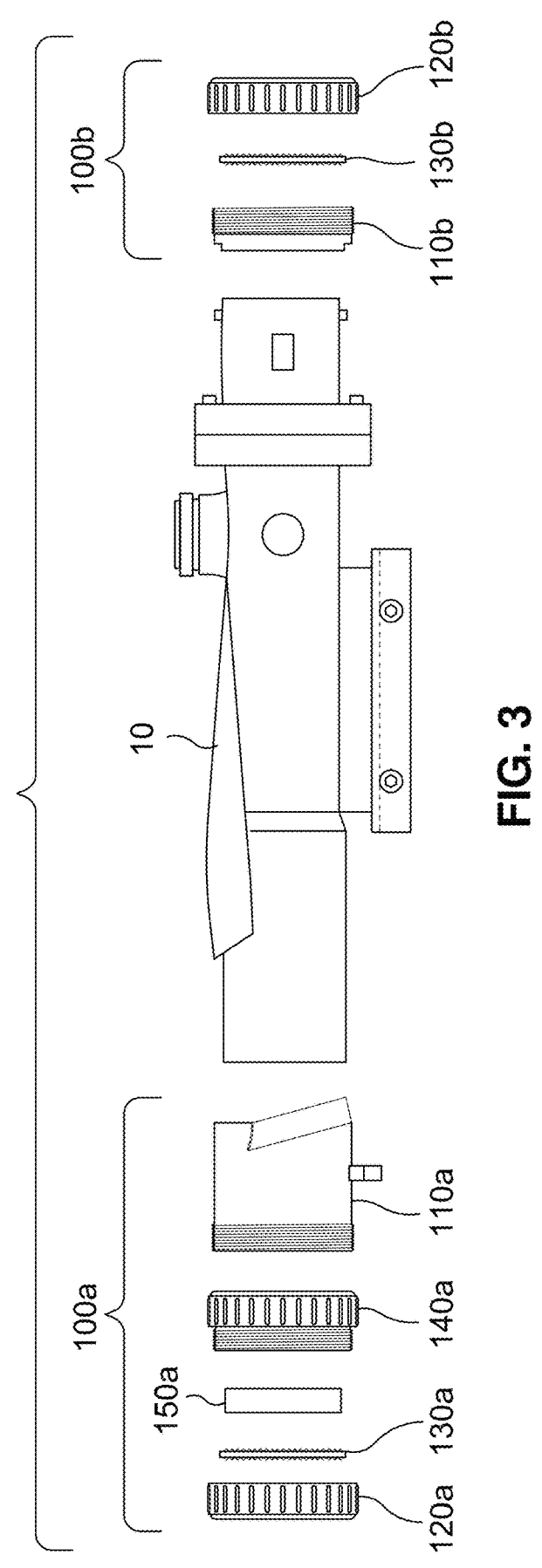
FIG. 3 is an exploded side view of the pair of scope protectors on either end of the weapon scope.
Figures 4, 5:
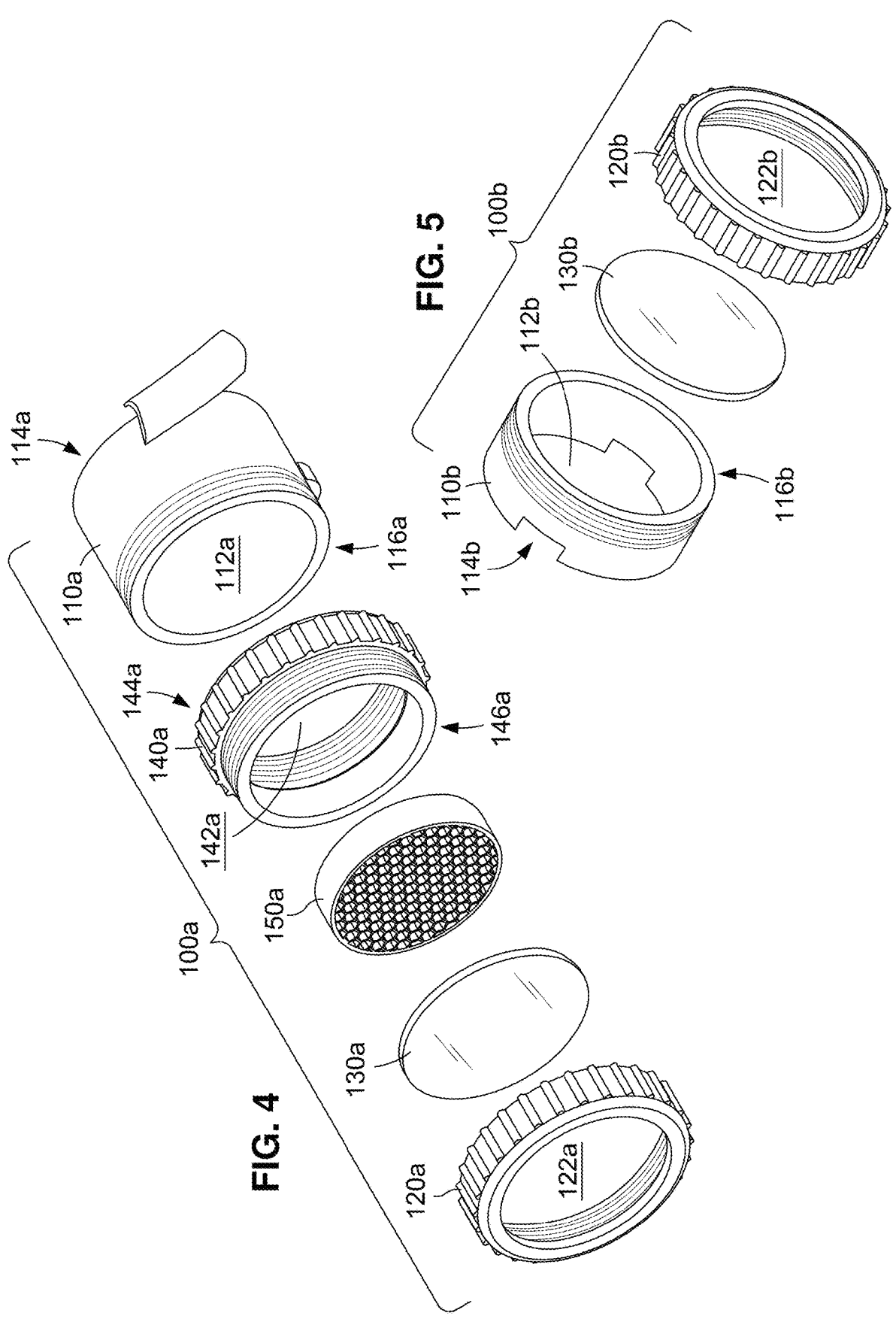
FIG. 4 is an exploded perspective view of a first of the scope protectors.
FIG. 5 is an exploded perspective view of a second of the scope protectors.
Figures 6, 7:
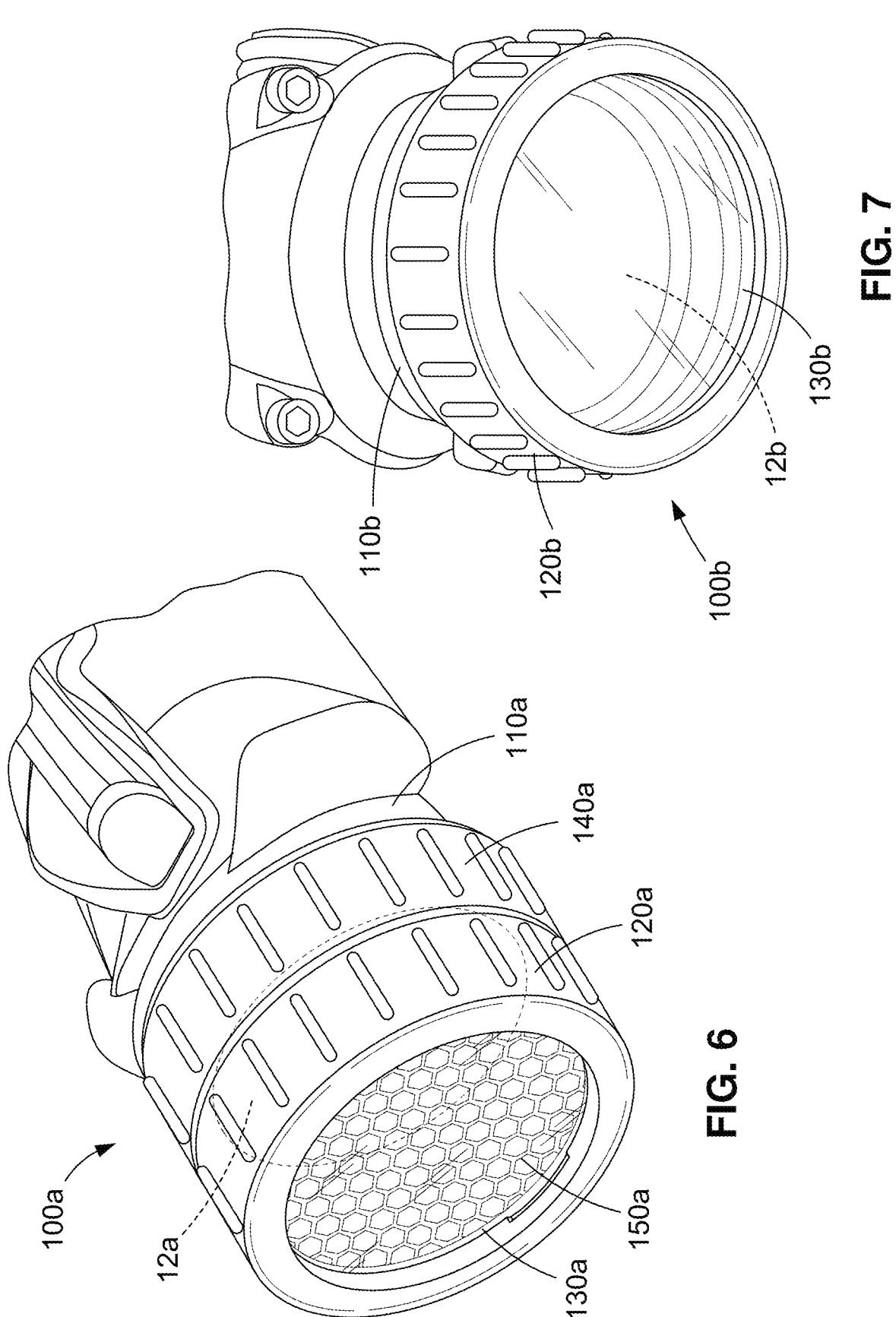
FIG. 6 is a perspective view of the first scope protector on a first end of the weapon scope.
FIG. 7 is a perspective view of the second scope protector on a second end of the weapon scope.

Referring to the exploded views of FIGS. 3-5 and the assembled views of FIGS. 6 and 7, the scope protector 100*a*, 100*b* may include a scope adapter 110*a*, 110*b* and a lens cover 120*a*, 120*b*. The scope adapter 110*a*, 110*b* may define a cylindrical bore 112*a*, 112*b* and may have a first end 114*a*, 114*b* that is configured to connect to an end of the weapon scope 10 to align the cylindrical bore 112*a*, 112*b* of the scope adapter 110*a*, 110*b* with a lens 12*a*, 12*b* of the weapon scope 10 (see FIGS. 6 and 7). In the illustrated embodiment, the scope protector 100*a* is adapted to be connected to a front end (e.g., an objective bell) of the weapon scope 10, while the scope protector 100*b* is adapted to be connected to a rear end (e.g., an eyepiece or ocular bell) of the weapon scope 10. As such, the first end 114*a* of the scope adapter 110*a* may have a shape or fitting that is adapted to mate with or grip a first end of a specific weapon scope 10 or to generically attach to front or objective ends of all or most weapon scopes 10 (e.g., by a tie or an elastic sheath that fits around the scope 10). Likewise, the second end 114*b* of the scope adapter 110*b* may have a shape or fitting that is adapted to mate with or grip a second end of a specific weapon scope 10 or to generically attach to rear or ocular ends of all or most weapon scopes 10.

The lens cover 120*a*, 120*b* may similarly define a cylindrical bore 122*a*, 122*b* and may be configured to connect to a second end 116*a*, 116*b* of the scope adapter 110*a*, 110*b* opposite the first end 114*a*, 114*b* to align the cylindrical bore 122*a*, 122*b* of the lens cover 120*a*, 120*b* with the lens 12*a*, 12*b* of the weapon scope 10. For example, the second end 116*a*, 116*b* of the scope adapter 110*a*, 110*b* may define threads, and the lens cover 120*a*, 120*b* may define corresponding threads allowing the lens cover 120*a*, 120*b* to be screwed onto the scope adapter 110*a*, 110*b*. A stack of one or more transparent polymer films 130*a*, 130*b* may be housed within the lens cover 120*a*, 120*b* so as to cover the cylindrical bore 122*a*, 122*b* thereof, thus serving as a protective cap that closes off the scope protector 100*a*, 100*b* from the external environment and prevents intrusion of moisture, dust, and dirt, for example. To this end, a scratch resistant topcoat or hard coat (e.g., an acrylic or fluoropolymer hard coat containing silica beads) may be applied to the transparent polymer film(s) 130*a*, 130*b*, particularly to an outermost surface that will be exposed to the external environment. At the same time, the transparent nature of the polymer film(s) 130*a*, 130*b* may allow the user to see clearly through the weapon scope 10 without there being any need to remove the scope protector 100*a*, 100*b*.

In order to ensure visual acuity through the stack of one or more transparent polymer films 130*a*, 130*b*, and in particular to prevent degradation in visibility through the weapon scope 10, the transparent polymer film(s) 130*a*, 130*b* may have an antireflective coating for minimizing internal reflection. The antireflective coating may preferably be a so-called moth-eye (ME) coating, which simulates the anti-reflective properties of a moth's eye by providing a pattern of microscopic bumps or nano-embossing that effectively eliminates the index of refraction interface between the film 130*a*, 130*b* and the air. Such an ME coating may be provided on one or both sides of a single transparent polymer film 130*a*, 130*b*, as well as on additional transparent polymer film(s) 130*a*, 130*b* if there are more than one. As one example, a 7-mil film have an ME coating on both sides may be used. The use of other types of antireflective coatings instead of or in addition to ME coating(s) is also contemplated, such as one or more single or multi-layer interference antireflective coatings which may be less expensive to produce while still providing suitable visual acuity, depending on the needs of the particular application. Additional examples of moth eye and/or other anti-reflective coatings that may be used are described in U.S. Pat. No. 11,585,962, entitled "Transparent Covering Having Anti-Reflective Coatings," in U.S. Pat. Nos. 11,307,329, 11,709, 296, and U.S. Patent Application Pub. No. 2024/0151881, all entitled "Low Reflectance Removable Lens Stack," and in U.S. Pat. No. 10,427,385, entitled "Low Reflectance Optical Web," the entire contents of each of which is incorporated by reference herein.

In addition to antireflective coatings, it is also contemplated that the transparent polymer film(s) 130*a*, 130*b* may have a coating containing one or more narrow band dyes in order to provide the scope protector 100*a*, 100*b* with enhanced visual acuity in different environments. A narrow band dye may have a full width at half maximum (FWHM) absorption bandwidth of 40 nm or less (e.g., 40-15 nm), for example, and may be selected for absorption in a specific frequency band of visual light, as may be optimized for the particular application, the intended environment, or the individual wearer (e.g., a person with red-green color blindness) based on computer simulation output. The one or more dyes may be combined with a binder to produce an adhesive or other coating containing the dye(s), such as a wet mount adhesive as disclosed in U.S. Pat. No. 9,128,545, entitled "Touch Screen Shield," the entire contents of which is incorporated by reference herein. Examples of incorporating narrow band dye(s) into stacks of polymer films may be found in Applicant's own U.S. patent application Ser. No. 18/823,572, filed Sep. 3, 2024 and entitled "Polymer Film with Narrow Band Dye," the entire contents of which is incorporated by reference herein. Example stacking and adhesive curing processes that may be used in connection with producing a stack of polymer films 130a, 130b are described in U.S. Pat. No. 11,933,943, entitled "Stack of Sterile Peelable Lenses with Low Creep," the entire contents of which is incorporated by reference herein.

The transparent polymer film(s) 130a, 130b themselves may be polyester films made of polyethylene terephthalate (PET), such as biaxially-oriented PET or BoPET. However, the contemplated polymer films are not limited in this respect and may, for example, be acrylic such as polymethyl methacrylate (PMMA), amorphous polyethylene terephthalate (APET), polyethylene terephthalate glycol (PETG), thermoplastic polyurethane (TPU), or polycarbonate. The polymer films may be selected for particular modulation transfer function (MTF) data or may be fabricated while actively monitoring the MTF data in a continuous or batch-to-batch process as described in U.S. Pat. No. 11,648,723 or U.S. Pat. No. 11,912,001, both entitled "Method and Apparatus for Reducing Non-Normal Incidence Distortion in Glazing Films," or as described in U.S. Pat. No. 11,548,356, entitled "Protective Barrier for Safety Glazing," the entire contents of each of which is incorporated by reference herein. In this regard, providing a polymer film may include, for example, melting a resin, extruding the melted resin through a die to produce a film, and cooling the film. Examples of TPU films may be found in U.S. Patent Application Pub. No. 2023/0249524, entitled "Multi-layer Windshield Film having Progressive Thickness Layers," the entire contents of which is incorporated by reference herein. Examples of low haze PET films that may be used (e.g., having a light transmittance of 87%-94% and a haze of 0.2% to 1.5%) may be found in U.S. Pat. No. 11,490,667, entitled "Low Haze UV Blocking Removable Lens Stack," the entire contents of which is incorporated by reference herein.

Figures 8, 9:
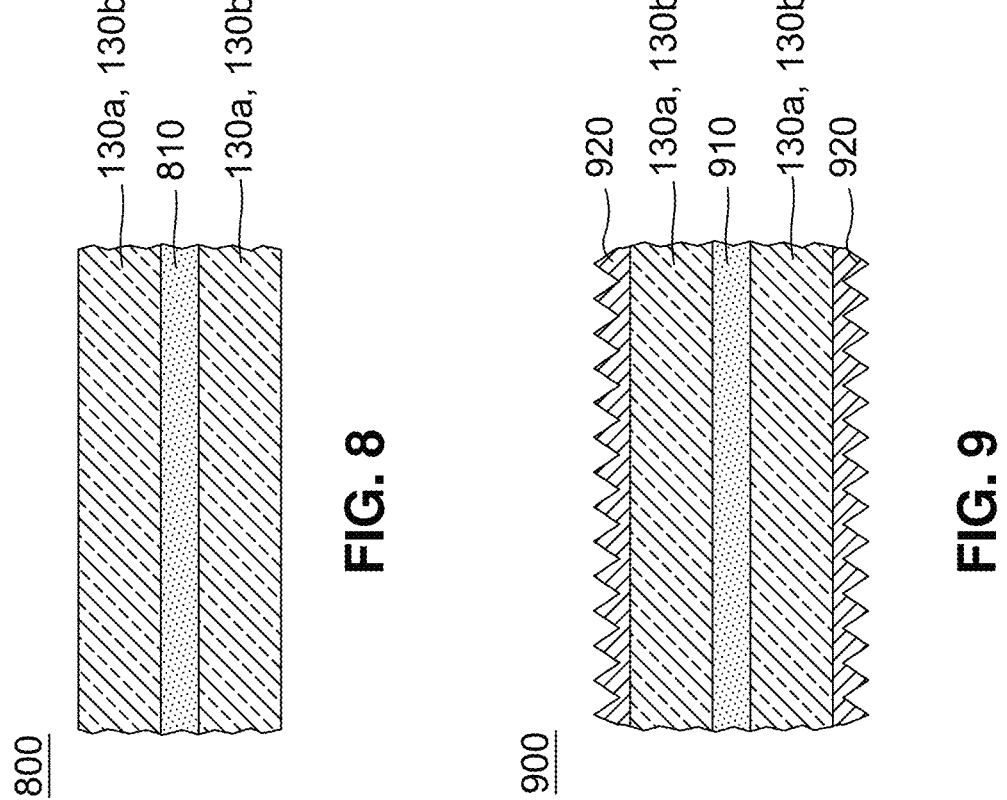
FIG. 8 is an example cross-sectional view of a stack of transparent polymer films.
FIG. 9 is another example cross-sectional view of a stack of transparent polymer films.

Example stacks 800, 900 that may serve as either or both of the stack of one or more transparent polymer film(s) 130a and the stack of one or more transparent polymer film(s) 130b are shown in FIGS. 8 and 9. The stack 800 of FIG. 8 illustrates an example where a pair of transparent polymer films 130a (or, likewise, a pair of transparent polymer films 130b in the case of the scope protector 100b) is adhered together by an adhesive 810 that may contain one or more narrow band dyes as described above. The stack 900 of FIG. 9 illustrates a further example, where the same pair of transparent polymer films 130a (or the same pair of transparent polymer films 130b) is adhered together by an adhesive 910 that may contain one or more narrow band dyes and is further coated with one or more antireflective coatings 920 such as moth eye coating(s) as depicted. In the illustrated example, a moth eye coating 920 is provided on both sides of the stack, i.e., on the outer surface of each film 130a, 130b opposite the inner surface that is coated with the adhesive 910. The stacks 800, 900 are only examples, and various other stacks of transparent polymer film(s) 130a, 130b may be used, including a single transparent polymer film 130a and/or a single transparent polymer film 130b.

Referring to FIGS. 3, 4, and 6, the scope protector 100a may comprise a diffuser 150a between the first end 116a of the scope adapter 110a and the transparent polymer film(s) 130a. The diffuser 150a may be a honeycomb diffuser as illustrated, for example, and may operate to diffuse light that is reflected off of a lens of the weapon scope 10 such as an objective lens 12a. The diffuser 150a may thus help to prevent someone (such as a hostile combatant) from locating the weapon scope 10 and consequently the position of the shooter or other user of the weapon scope 10. Since this concern is greatest in relation to spotting the front of the weapon scope 10, the illustrated examples show the diffuser 150a as part of the scope protector 100a (to be connected to the front end of the weapon scope 10), though the use of a diffuser is not necessarily limited in this respect. As most clearly depicted in FIG. 4, the scope protector 100a may comprise a diffuser adapter 140a defining a cylindrical bore 142a, and the diffuser 150a may be housed within the diffuser adapter 140a and arranged to diffuse light entering the cylindrical bore 142a thereof. The diffuser adapter 140a may have a first end 144a that is configured to connect to the second end 116a of the scope adapter 110a to align the cylindrical bore 142a of the diffuser adapter 140a with the lens 12a of the weapon scope 10. The lens cover 120a may in turn be configured to connect to a second end 146a of the diffuser adapter 140a opposite the first end 144a to align the cylindrical bore 122a of the lens cover 120a with the lens 12a of the weapon scope 10.

As noted above, it is also contemplated that the lens cover 120a may itself be configured to connect to the second end 116a of the scope adapter 110a. That is, the assembly of the scope protector 100a may omit the diffuser adapter 140a containing the diffuser 150a, just like the illustrated example of the scope protector 100b. In this respect, several possibilities are contemplated. First, a scope protector 100a may be designed, produced, and marketed that does not include any diffuser 150a or diffuser adapter 140a at all. As a second possibility, the scope protector 100a may be designed, produced, and marketed that necessarily includes the diffuser 150a and diffuser adapter 140a. In this instance, the lens cover 120a may not necessarily be capable of connecting directly to the second end 116a of the scope adapter 110a (e.g., the threading or other connection means may be incompatible) and may only be capable of connecting to the second end 146a of the diffuser adapter 140a (which itself is connectable at its first end 144a to the scope adapter 110a). As a third and most versatile possibility, the scope protector 100a may have a modular design that allows for the diffuser adapter 140a containing the diffuser 150a to be optionally inserted by the user as desired. In this case, the threading (or other connection means) on the second end 116a of the scope adapter 110a may be the same as the threading (or other connection means) on the second end 146a of the diffuser adapter 140a. Correspondingly, the threading (or other connection means) on the first end 144a of the diffuser adapter 140a may be the same as the threading (or other connection means) of the lens cover 120a. As such, the lens cover 120a may be configured to connect both to the second end 116a of the scope adapter 110a and to the second end 146a of the diffuser adapter 140a according to the user's preference or the particular application, with the first end of the diffuser adapter 144a being configured to connect to the second end 116a of the scope adapter 110 in place of the lens cover 120a as desired.

Unlike conventional scope caps and covers, the various embodiments of scope protectors 100a, 100b described herein may protect the weapon scope 10 while simultaneously allowing the user to see through the weapon scope 10, requiring no removal or manipulation during ordinary use. Over time, however, with repeated use, the scope protector 100a, 100b may become tarnished (though it is contemplated that the application of a hard coat may extend its lifetime). With this in mind, it is contemplated that all or a portion of the scope protector 100a, 100b may be disposable and easily replaceable. For example, the lens cover 120a, 120b (containing the one or more transparent polymer films 130a, 130b) may be disposed of and replaced periodically in order to maintain pristine condition of the transparent polymer film(s) 130a, 130b for optimal visual acuity. To avoid any need on the part of the user to handle the transparent polymer film(s) 130a, 130b itself, the transparent polymer film(s) 130a, 130b may be securely housed within the lens cover 120a, 120b (e.g., by adhesive or by being trapped between a two-piece construction). The user may then simply unscrew or otherwise disconnect the entire lens cover 120a, 120b and swap it for another as the need arises. For the sake of simplicity and case of use, it is contemplated that the lens cover 120a (e.g., for the front of the scope 10) may be identical to the lens cover 120b (e.g., for the rear of the scope 10), with any difference between the sizes or shapes of the objective bell and eyepiece bell being accounted for by the construction of the scope adapters 110a, 110b. That is, the scope adapters 110a, 110b may differ from each other in their first ends 114a, 114b (as needed for connection to the different ends of the scope 10), while being identical to each other in their second ends 116a, 116b to allow for universal compatibility with lens covers 120a, 120b or any intervening parts such as the diffuser adapter 140a described herein.

The various parts of the scope protector 100a, 100b, including the scope adapter 110a, 110b and lens cover 120a, 120b, as well as the diffuser adapter 140a and diffuser 150a, may preferably be made of plastic or elastomer, e.g., a thermoplastic polymer such as acrylonitrile butadiene styrene (ABS) or a polyurethane plastic such as TPU. The individual parts may be made by a molding process such as injection molding, for example.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A scope protector for a weapon scope, the scope protector comprising:

a scope adapter defining a cylindrical bore, the scope adapter having a first end that is configured to connect to an end of the weapon scope to align the cylindrical bore of the scope adapter with a lens of the weapon scope;

a lens cover defining a cylindrical bore, the lens cover being configured to connect to a second end of the scope adapter opposite the first end to align the cylindrical bore of the lens cover with the lens of the weapon scope;

a transparent polymer film housed within the lens cover so as to cover the cylindrical bore thereof;

a diffuser between the first end of the scope adapter and the transparent polymer film; and a diffuser adapter defining a cylindrical bore, the diffuser being housed within the diffuser adapter and arranged to diffuse light entering the cylindrical bore thereof, the diffuser adapter having a first end that is configured to connect to the second end of the scope adapter in place of the lens cover to align the cylindrical bore of the diffuser adapter with the lens of the weapon scope, wherein the lens cover is configured to connect to a second end of the diffuser adapter opposite the first end to align the cylindrical bore of the lens cover with the lens of the weapon scope.

2. The scope protector of claim 1, wherein the transparent polymer film has an antireflective coating.

3. The scope protector of claim 2, wherein the antireflective coating comprises a moth eye coating.

4. The scope protector of claim 1, wherein the transparent polymer film has a hard coat.

5. The scope protector of claim 1, wherein the transparent polymer film has a coating containing one or more dyes each having a full width at half maximum (FWHM) absorption bandwidth of 40 nm or less.

6. The scope protector of claim 1, wherein the transparent polymer film comprises biaxially oriented polyethylene terephthalate (BoPET).

7. The scope protector of claim 1, wherein the diffuser comprises a honeycomb diffuser.

8. A scope protector for a weapon scope, the scope protector comprising:

a scope adapter defining a cylindrical bore, the scope adapter having a first end that is configured to connect to an end of the weapon scope to align the cylindrical bore of the scope adapter with a lens of the weapon scope;

a diffuser adapter defining a cylindrical bore, the diffuser adapter having a first end that is configured to connect to the second end of the scope adapter to align the cylindrical bore of the diffuser adapter with the lens of the weapon scope;

a diffuser housed within the diffuser adapter and arranged to diffuse light entering the cylindrical bore thereof;

a lens cover defining a cylindrical bore, the lens cover being configured to connect to a second end of the diffuser adapter opposite the first end to align the cylindrical bore of the lens cover with the lens of the weapon scope; and a transparent polymer film housed within the lens cover so as to cover the cylindrical bore thereof.

9. The scope protector of claim 8, wherein the transparent polymer film has an antireflective coating.

10. The scope protector of claim 9, wherein the antireflective coating comprises a moth eye coating.

11. The scope protector of claim 8, wherein the transparent polymer film has a hard coat.

12. The scope protector of claim 8, wherein the transparent polymer film has a coating containing one or more dyes each having a full width at half maximum (FWHM) absorption bandwidth of 40 nm or less.

13. The scope protector of claim 8, wherein the transparent polymer film comprises biaxially oriented polyethylene terephthalate (BoPET).

14. The scope protector of claim 8, wherein the diffuser comprises a honeycomb diffuser.

15. A scope protector for a weapon scope, the scope protector comprising:

a scope adapter defining a cylindrical bore, the scope adapter having a first end that is configured to connect to an end of the weapon scope to align the cylindrical bore of the scope adapter with a lens of the weapon scope;

a lens cover defining a cylindrical bore, the lens cover being configured to connect to a second end of the scope adapter opposite the first end to align the cylindrical bore of the lens cover with the lens of the weapon scope;

a stack of two or more transparent polymer films housed within the lens cover so as to cover the cylindrical bore thereof; and a diffuser between the first end of the scope adapter and the stack of two or more transparent polymer films.

16. The scope protector of claim 15, further comprising an adhesive between an adjacent pair of the transparent polymer films.

17. The scope protector of claim 16, wherein the adhesive contains one or more dyes, each of the one or more dyes having a full width at half maximum (FWHM) absorption bandwidth of 40 nm or less.

* * * * *